US007814491B1

(12) United States Patent
Chen et al.

(10) Patent No.: US 7,814,491 B1
(45) Date of Patent: Oct. 12, 2010

(54) METHOD AND APPARATUS FOR MANAGING SYSTEM RESOURCES USING A CONTAINER MODEL

(75) Inventors: Ling Long Chen, Fremont, CA (US); Joost Willem Daniel Pronk Van Hoogeveen, Mountain View, CA (US); Nils Peder Pedersen, Cascade, CO (US); Xuemei Gao, Fremont, CA (US); Amol A. Chiplunkar, Bangalore (IN); Harapanahalli Gururaja Rao, Sunnyvale, CA (US); John Meldrum Perry, San Jose, CA (US); Ross Adam Margo, Fremont, CA (US); Estelle Jeanine Chiquet, Elk Grove, CA (US)

(73) Assignee: Oracle America, Inc., Redwood City, CA (US)

( * ) Notice: Subject to any disclaimer, the term of this patent is extended or adjusted under 35 U.S.C. 154(b) by 1581 days.

(21) Appl. No.: 10/824,074

(22) Filed: Apr. 14, 2004

(51) Int. Cl.
G06F 9/46 (2006.01)
G06F 15/173 (2006.01)
(52) U.S. Cl. .................. 718/104; 718/100; 709/226
(58) Field of Classification Search ................ 718/100, 718/102, 104, 1; 709/226
See application file for complete search history.

(56) References Cited

U.S. PATENT DOCUMENTS

| 6,366,945 | B1 * | 4/2002 | Fong et al. ............... 718/104 |
| 6,374,266 | B1 * | 4/2002 | Shnelvar .................. 707/204 |
| 6,526,521 | B1 * | 2/2003 | Lim ............................ 714/4 |
| 6,578,141 | B2 * | 6/2003 | Kelley et al. ............... 713/1 |
| 6,587,938 | B1 * | 7/2003 | Eilert et al. ............... 712/29 |
| 6,587,959 | B1 * | 7/2003 | Sjolander et al. ........... 714/4 |
| 6,609,213 | B1 * | 8/2003 | Nguyen et al. .............. 714/4 |
| 6,633,916 | B2 * | 10/2003 | Kauffman ................ 709/229 |
| 6,678,700 | B1 * | 1/2004 | Moore et al. ............. 707/200 |
| 6,789,156 | B1 * | 9/2004 | Waldspurger ............... 711/6 |
| 6,799,208 | B1 * | 9/2004 | Sankaranarayan et al. .. 709/223 |
| 6,865,688 | B2 * | 3/2005 | Dawkins et al. ............. 714/6 |
| 6,922,791 | B2 * | 7/2005 | Mashayekhi et al. ......... 714/4 |
| 6,944,699 | B1 * | 9/2005 | Bugnion et al. ............ 710/269 |
| 7,064,766 | B2 * | 6/2006 | Beda et al. ................ 345/557 |
| 7,096,469 | B1 * | 8/2006 | Kubala et al. ............. 718/100 |
| 7,117,371 | B1 * | 10/2006 | Parthasarathy et al. ...... 713/187 |
| 7,137,119 | B1 * | 11/2006 | Sankaranarayan et al. .. 718/103 |
| 7,150,020 | B2 * | 12/2006 | Kalhour .................... 718/104 |
| 7,225,223 | B1 * | 5/2007 | McCarthy et al. .......... 709/204 |
| 7,406,522 | B2 * | 7/2008 | Riddle ..................... 709/226 |
| 7,412,514 | B2 * | 8/2008 | Shuster .................... 709/226 |
| 7,433,951 | B1 * | 10/2008 | Waldspurger .............. 709/226 |
| 7,472,107 | B2 * | 12/2008 | Agrawal et al. .............. 707/2 |
| 2002/0161817 | A1 * | 10/2002 | Dorofeev et al. ........... 709/104 |
| 2002/0170045 | A1 * | 11/2002 | Hahn ........................ 717/162 |
| 2003/0037092 | A1 * | 2/2003 | McCarthy et al. .......... 709/104 |
| 2003/0110173 | A1 * | 6/2003 | Marsland ................... 707/10 |
| 2004/0003063 | A1 * | 1/2004 | Ashok et al. ............... 709/221 |
| 2004/0133609 | A1 * | 7/2004 | Moore et al. ............. 707/200 |

(Continued)

Primary Examiner—Meng-Ai An
Assistant Examiner—Caroline Arcos
(74) Attorney, Agent, or Firm—Osha • Liang LLP (57) ABSTRACT

A method for managing system resources including creating a container, wherein creating the container comprises allocating a first portion of a first resource to the container, associating the container with a resource pool, wherein the resource pool is associated with the first resource, determining whether the first portion of the first resource is valid, and activating the container if the first portion of the first resource is valid.

30 Claims, 5 Drawing Sheets

U.S. PATENT DOCUMENTS

| | | | |
|---|---|---|---|
| 2004/0158834 A1* | 8/2004 | Ham et al. | 718/104 |
| 2004/0168170 A1* | 8/2004 | Miller | 718/104 |
| 2004/0172629 A1* | 9/2004 | Tene et al. | 718/1 |
| 2004/0199473 A1* | 10/2004 | Birkestrand et al. | 705/64 |
| 2005/0044228 A1* | 2/2005 | Birkestrand et al. | 709/226 |
| 2005/0060722 A1* | 3/2005 | Rochette et al. | 719/319 |
| 2005/0091346 A1* | 4/2005 | Krishnaswami et al. | 709/220 |
| 2005/0177635 A1* | 8/2005 | Schmidt et al. | 709/226 |
| 2006/0179124 A1* | 8/2006 | Stefaniak et al. | 709/219 |

\* cited by examiner

METHOD AND APPARATUS FOR MANAGING SYSTEM RESOURCES USING A CONTAINER MODEL

BACKGROUND

As the complexity of computer systems has increased, the operating system executing in the computer systems have also become more sophisticated. Specifically, operating systems have been augmented to include resource management utilities. Resource management utilities enable system users to control how processes executing on the computer system use the available system resources (e.g., central processing units (CPUs), physical memory, bandwidth, etc.).

The resource management utilities provide a number of different resource management control mechanisms to control system resource allocation for processes, such as CPU shares allocation, physical memory control, system resource partitioning, etc. Each of the aforementioned resource management control mechanisms may be applied independently and individually to each application (or service (i.e., group of related applications) executing on the computer system. Alternatively, each of the aforementioned resource management control mechanisms may be applied to one or more applications in combination. The resource management control mechanisms described above may be generically categorized into three distinct types: constraint mechanisms, scheduling mechanisms, and partitioning mechanisms.

Constraint mechanisms allow a system user (e.g., a system administrator) or an application developer to set bounds on the consumption of a specific system resource for an application or one or more processes within an application. Once the bounds on resource consumption are specified, the system user and/or application developer may readily and easily model system resource consumption scenarios. Further, the bounds on resource consumption may also be used to control ill-behaved applications that would otherwise compromise computer system performance or availability through unregulated system resource requests.

Scheduling mechanisms allow a system to make a sequence of system resource allocation decisions at specific time intervals. The decision about how to allocate a particular system resource is typically based on a predictable algorithm. In some instances, the scheduling algorithm might guarantee that all applications have some access to the system resource. Scheduling mechanisms enable improved utilization of an under committed system resource, while providing controlled allocations in a critically committed or overcommitted system resource utilization scenario.

Partitioning mechanisms allow a system user to bind a particular application (or one or more sub-processes within the application) to a subset of available system resources. This binding guarantees that a known amount of system resources is always available to the application (or one or more sub-processes within the application).

Operating systems providing the above-mentioned resource management control mechanisms typically provide a resource management utility and/or an application programming interface (API) for each of the mechanisms. Further, each of the resource management utilities/APIs provides a number of different options for the system user to select and configure. In general, the resource management utilities/APIs are not tightly coupled together. In addition, as the operating system evolves, different versions of the resource management utilities/APIs become available that have different options and functionality. Accordingly, in order for a system user to take advantage of the aforementioned mechanisms, the system user typically requires a thorough understanding of the different types of resource management control mechanisms as well as the relationship/interaction between the various resource management control mechanisms.

SUMMARY

In general, in one aspect, the invention relates to a method for managing system resources, comprising creating a container, wherein creating the container comprises allocating a first portion of a first resource to the container, associating the container with a resource pool, wherein the resource pool is associated with the first resource, determining whether the first portion of the first resource is valid, and activating the container if the first portion of the first resource is valid.

In general, in one aspect, the invention relates to a resource management system, comprising a first resource and a second resource, a first resource pool, wherein the resource pool is allocated a portion of the first resource and a portion of the second resource, a first container residing in the first resource pool, wherein the first container comprises a requirements specification for the first resource for the first container and a requirements specification for the second resource for the first container, and a management interface configured to verify the requirements specification for the first resource with the allocated portion of the first resource, and verify the requirements specification for the second resource with the allocated portion of the second resource.

In general, in one aspect, the invention relates to a network system having a plurality of nodes, including a first resource and a second resource, a first resource pool, wherein the resource pool is allocated a portion of the first resource and a portion of the second resource, a first container residing in the first resource pool, wherein the first container comprises a requirements specification for the first resource for the first container and a requirements specification for the second resource for the first container, and a management interface configured to verify the requirements specification for the first resource with the allocated portion of the first resource, and verify the requirements specification for the second resource with the allocated portion of the second resource, wherein the first resource is located on any one of the plurality of nodes, wherein the second resource is located on any one of the plurality of nodes, wherein the first resource pool is located on any one of the plurality of nodes, wherein the container is located on any one of the plurality of nodes, wherein the management interface executes on any one of the plurality of nodes.

Other aspects of the invention will be apparent from the following description and the appended claims.

DETAILED DESCRIPTION

Exemplary embodiments of the invention will be described with reference to the accompanying drawings. Like items in the drawings are shown with the same reference numbers.

In one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention provide a method and apparatus for system resource management. One or more embodiments of the invention provide a simple model that helps manage the complexity of the resource management control mechanisms and their different resource management utilities/APIs for system users. In one embodiment of the invention, a system user may create a container and define the system resources allocated to the particular container. Applications (and services) may then be executed within the container and their performance/system resource usage may be controlled and monitored.

Figure 1:
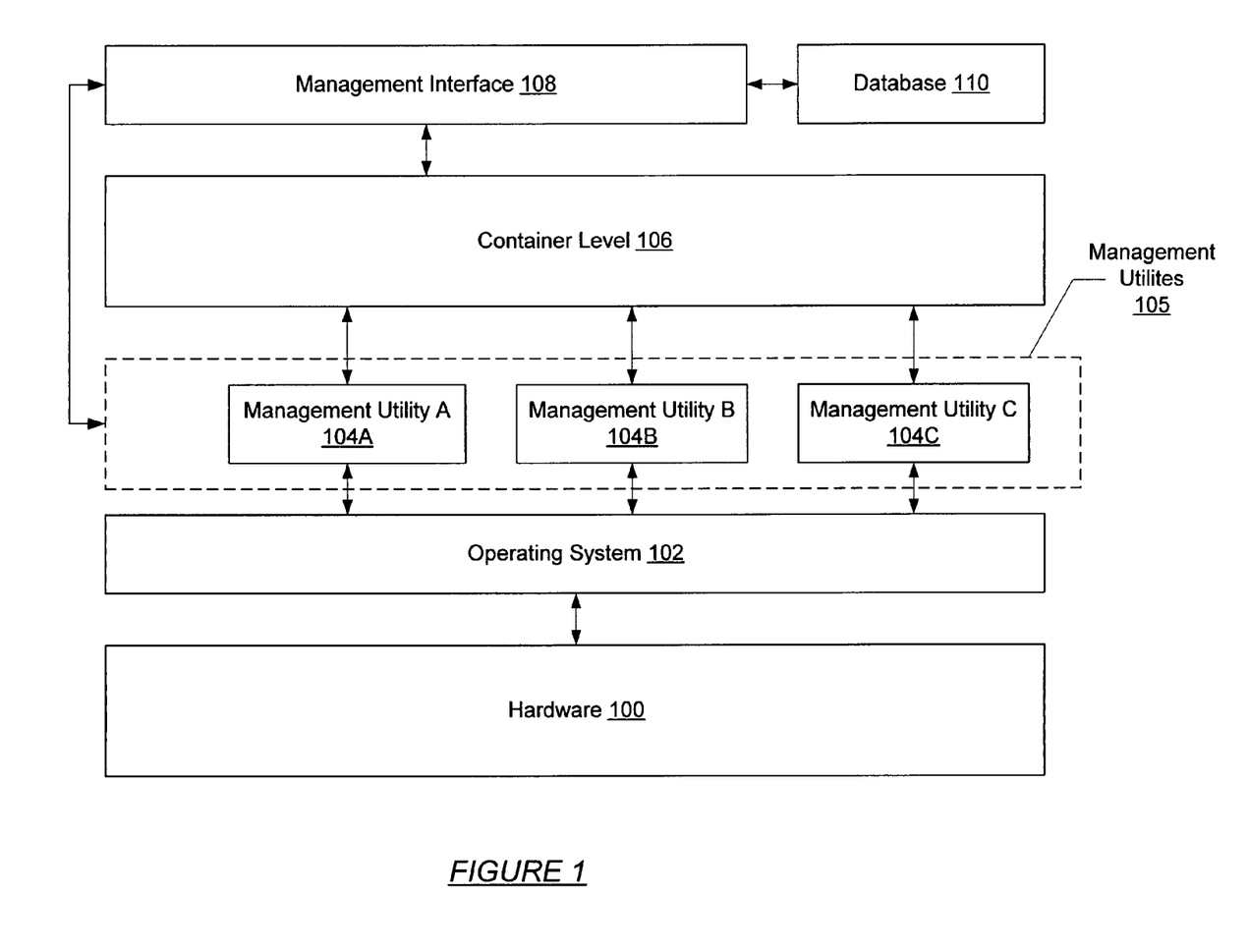
FIG. 1 shows a system architecture in accordance with one embodiment of the invention.

FIG. 1 shows a system architecture in accordance with one embodiment of the invention. The system includes hardware (100) (e.g., CPUs, physical memory, network interface cards, etc.) and an operating system (102) executing on the hardware (100). The operating system (102) includes a number of management utilities (i.e., Management Utility A (104A), Management Utility B (104B), Management Utility C (104C)). The management utilities (105) (i.e., Management Utility A (104A), Management Utility B (104B), Management Utility C (104C)) typically provide resource management control mechanisms (e.g., constraint mechanisms, scheduling mechanisms, partitioning mechanisms, etc.) to manage system resources (e.g., CPUs, physical memory, bandwidth, etc.).

In one embodiment of the invention, a container level (106) interfaces with the management utilities (i.e., Management Utility A (104A), Management Utility B (104B), Management Utility C (104C)). The container level (106) typically includes one or more containers. The container level (106) is described in FIGS. 2 and 3. The container level (106) interfaces with a management interface (108). The management interface (108) provides a system user an interface to specify how resources are to be allocated within a given container in the container level (106). In one embodiment of the invention, the management interface (108) includes a graphical user interface to allow the system user to specify the system resource allocation.

Figure 2:
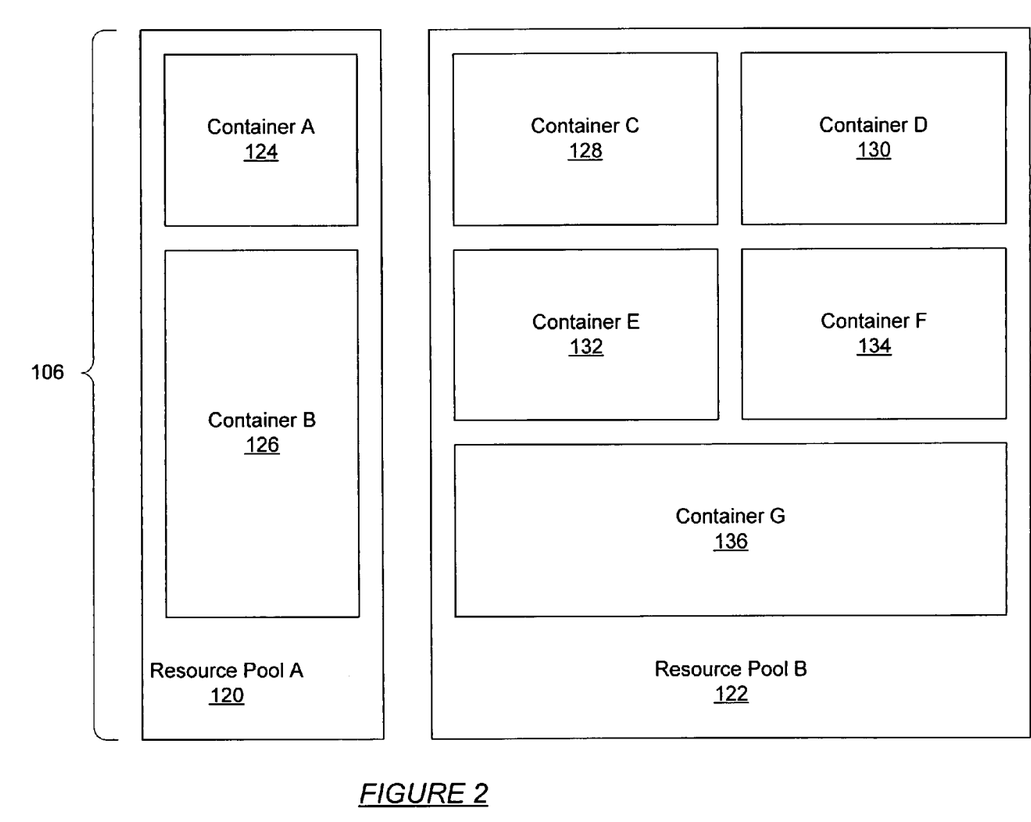
FIG. 2 shows a view of a container level in accordance with one embodiment of the system.

In one embodiment of the invention, the management interface (108) may include functionality to define a container, create a resource pool (as shown in FIG. 2), deploy the container in a particular resource pool, activate the container, modify the container (e.g., modify the resources allocated to the container), deactivate the container, and delete the container.

As noted above, the management interface includes functionality to modify the container definition for one or more containers. In one embodiment of the invention, this functionality is extended to allow a system user to change the container definition for deployed containers that have the same container definition. The aforementioned functionality is hereafter referred to as a "Schedule Change" functionality.

In one embodiment of the invention, the Schedule Change Job functionality is implemented in the following manner. Initially, a system user creates a job on selected deployed containers that have the same container definition. Once the job is created it may be executed immediately or at a scheduled time. The changes specified in the job will be applied to those selected containers. In one embodiment of the invention, the job is specific to a container, and may include a list of hosts on which the containers are deployed, a resource specification for one or more system resources, and a schedule to run the job.

Consider the following example, in an enterprise environment, a container called Web Service, which is created for all Web Service related processes, is deployed on a system located in San Francisco and on another system in New York City. During the business hours (peak time), the Web Service containers require 4 CPUs and 2 GB of physical memory to handle all requests. In the evening, the Web Service containers only require 1 CPU and 512 MB of physical memory.

In this scenario, the system administrator could create the following two jobs to change the container definition for the Web Service Container. Specifically, Job 1 would set the CPU specification to 4 CPUs, the physical memory cap to 2 GB, and would be scheduled to execute at the beginning of business hours in the respective geographic locations. Job 2 would set the CPU specification to 1 CPU, the physical memory cap to 512 MB, and would be scheduled to execute at the end of business hours in the respective geographic locations.

Further, the management interface (108) may include functionality to track system resource usage for a given container and graphically display the system resource usage of the particular container to the system user. In one embodiment of the invention, the management resource interface (108) may also include functionality to export a container's system resource usage in a format (e.g., comma separated variable format) that may be imported into a word/accounting information processing tool. In addition, the management interface (108) may include functionality to determine whether a particular container or application/service running in the container is using more system resources than are allocated to the particular container and to notify/alert the system user if this situations exists. For example, the system user may be alerted via an e-mail message.

In one embodiment of the invention, the management interface includes functionality to identify, monitor, and measure the performance of two or more instances of a container (i.e., distinct containers having the same container definition (described below)) executing on different systems on a network.

Further, the management interface (108) may include functionality to convert the system resource allocations specified by the system user for the containers into commands that are understood by the management utilities (105) (i.e., Management Utility A (104A), Management Utility B (104B), Management Utility C (104C)). Further, the management interface (108) interfaces with a database (110). In one embodiment of the invention, the management interface (108) includes functionality to discover the system resources that are available on the particular computer system and store this information in the database (110).

In one embodiment of the invention, the database (110) stores the container definitions (i.e., what system resources are allocated to the particular container, etc.) Further, the database (110) stores information about the system resources that are available on the computer system. In addition, the database (110) may include functionality to store the system resource usage per container.

FIG. 2 shows a detailed view of a container level in accordance with one embodiment of the system. The container level (106) is partitioned into resource pools (e.g., Resource Pool A (120) and Resource Pool B (122)). In one embodiment of the invention, the resource pools (e.g., Resource Pool A (120) and Resource Pool B (122)) provide a persistent configuration mechanism for processor set configuration, and optionally, scheduling class assignment (e.g., Fair Share Scheduling (FSS), Time Share Scheduling (TSS), etc.). Accordingly, each resource pool (e.g., Resource Pool A (120) and Resource Pool B (122)) is associated with a processor set (e.g., typically $2^n$ CPUs where n is a whole number).

In one embodiment of the invention, the following information may be stored in the database (110 in FIG. 1) or an alternate location, for each resource pool: resource pool name, number of CPUs in the resource pool, the processor set associated with the resource pool, the scheduling class assignment for the resource pool, etc. In one embodiment of the invention, the following information may be stored in the database (110 in FIG. 1), or an alternate location, for each processor set: processor set name, processor set ID, number of CPUs in processor set, minimum size of processor set, maximum size of processor set, etc.

Residing in each resource pool (e.g., Resource Pool A (120) and Resource Pool B (122)) is one or more containers. For example, Container A (124) and Container B (126) reside in resource pool A (120), while Container C (128), Container D (130), Container E (132), Container F (134), and Container G (136) reside in Resource Pool B (122). In one embodiment of the invention, each container may be described as a multi-dimensional system resource space in which an application (or service) may be executed. The size of the container is typically determined by the amount of each system resource allocated to the container (e.g., the number of CPUs allocated, the amount of physical memory allocated, the amount of network bandwidth, etc).

Though not shown in FIG. 2, applications (or services) executing in a container correspond to one or more processes. In one embodiment of the invention, all processes executing in a container are associated with the same ID (e.g., a project ID). The ID may be used to track system resource usage for each container and also to enforce constraints on system resource usage.

In one embodiment of the invention, the following information may be stored in the database (110), or an alternate location, for each container: container ID, container name, project ID, description (e.g., brief description of the properties of the container or the textual description used to identify the container, etc.), name of associated resource pool, minimum number of CPUs required for container activation, the minimum and/or maximum upload (i.e., outgoing) bandwidth required, the minimum download bandwidth required, maximum physical memory allocated to the container, etc. In addition, the following information may be stored in the database, or an alternate location, for each container: real time CPU usage, CPU usage in percentage of total system, real time virtual memory usage, access control lists (ACL), and expressions.

In one embodiment of the invention, an ACL may be used to specify which users may be allowed to join the container and execute applications (or services) within the container. Further, the ACL may also specify groups of users that may join the container and execute applications (or services) within the container. In one embodiment, expressions correspond to regular expressions that may be used to determine whether a particular process may be moved into the container.

Figure 3:
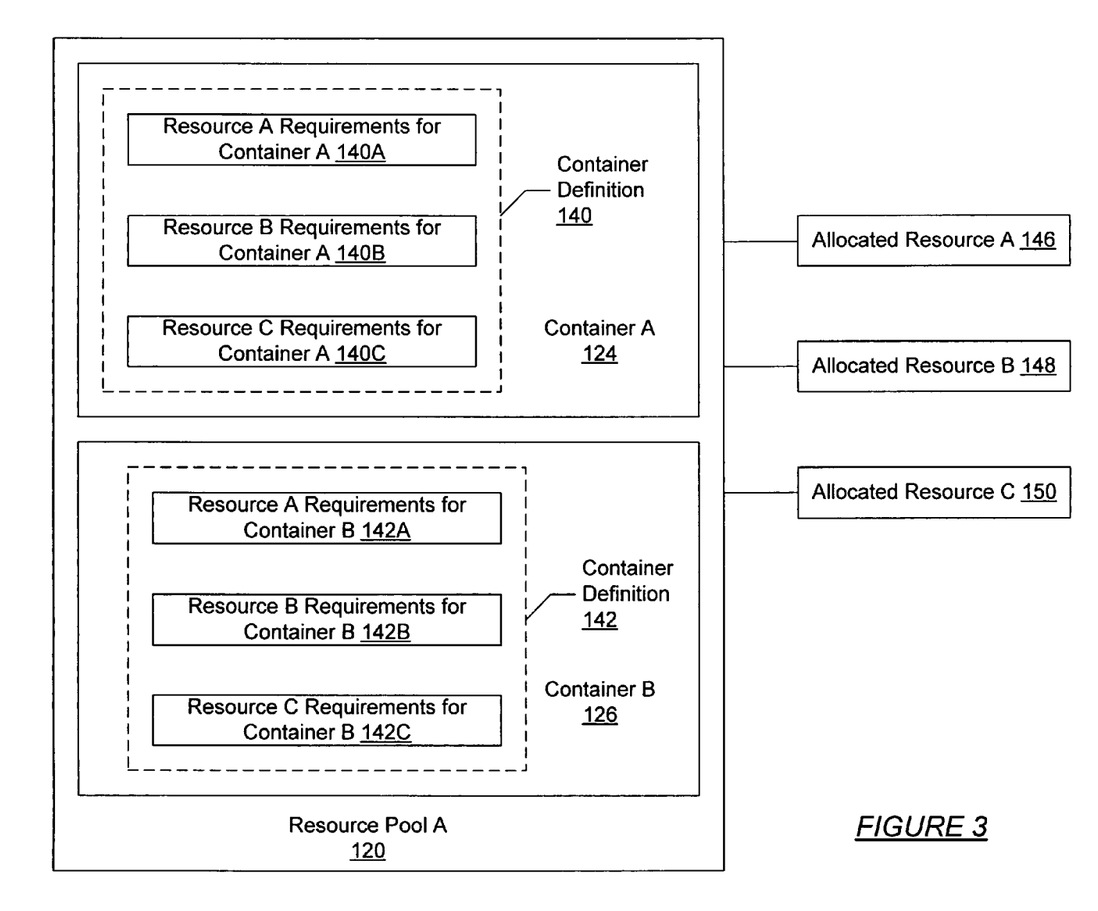
FIG. 3 shows a view of a resource pool in accordance with one embodiment of the invention.

FIG. 3 shows a detailed view of a resource pool in accordance with one embodiment of the invention. Allocated Resource A (146), Allocated Resource B (148), and Allocated Resource C (150) are allocated to Resource Pool A (120). In one embodiment of the invention, Allocated Resource A (146), Allocated Resource B (148), and Allocated Resource C (150) correspond to CPU, physical memory, and bandwidth, respectively. Further, each of the allocated resources (e.g., Allocated Resource A (146), Allocated Resource B (148), and Allocated Resource C (150)) may individually correspond to the entire system resource available on the computer system or only a portion thereof.

The allocated resources (e.g., Allocated Resource A (146), Allocated Resource B (148), and Allocated Resource C (150)) are further sub-divided by the containers (i.e., Container A (124) and Container B (126)). Specifically, when a container is created, a container definition (140, 142) is specified. The container definition (140, 142) defines the resource requirements for each of the resources on a per container basis. For example, Container A (124) includes a container definition (140) that defines Resource A Requirements for Container A (140A), Resource B Requirements for Container A (140B), and Resource C Requirements for Container A (140C). Further, Container B (126) includes a container definition (142) that defines Resource A Requirements for Container B (142A), Resource B Requirements for Container B (142B), and Resource C Requirements for Container B (142C). In one embodiment of the invention, prior to placing a container in a given resource pool, the management interface (108) (or a related process) verifies whether the resource pool has sufficient resources to support the container.

In one embodiment of the invention, the minimum CPUs required for a given container is specified as the number of CPUs. For example, the system user may specify that 0.5 CPUs are required by the container, where 0.5 CPUs corresponds to 50% of a given CPU resource. Note that by specifying the number of CPUs required by the container, the management interface may readily validate the allocation by obtaining the total number of CPUs available in the computer system (which is calculated from the total number of CPUs in the computer system less the number of CPUs reserved by other containers). This approach provides an efficient way to avoid over-booking (or over-allocation) of CPUs within the computer system. In one embodiment of the invention, physical memory and bandwidth required by the container are specified and validated in the same manner as CPUs.

In one embodiment of the invention, to aid in defining resource requirements for a particular container, the number of CPUs, available size of physical memory, and available bandwidth are calculated and displayed to the system user when the container is created. The aforementioned information may aid the system user in entering appropriate resource requirements. In one embodiment of the invention, the container definition may be modified at any time after the container is created.

Though not shown in FIG. 3, in one embodiment of the invention, each resource pool (e.g., Resource Pool A (120)) may include a default container. The default container corresponds to a container that may use all the system resources allocated to the corresponding resource pool in which the default container resides. Typically, the default container is used when a non-default container in the resource pool is deactivated but an application (or service) is still executing in the non-default container. In this scenario, the application (or service) executing in the non-default container is transferred to the default container to continue execution.

Figure 4:
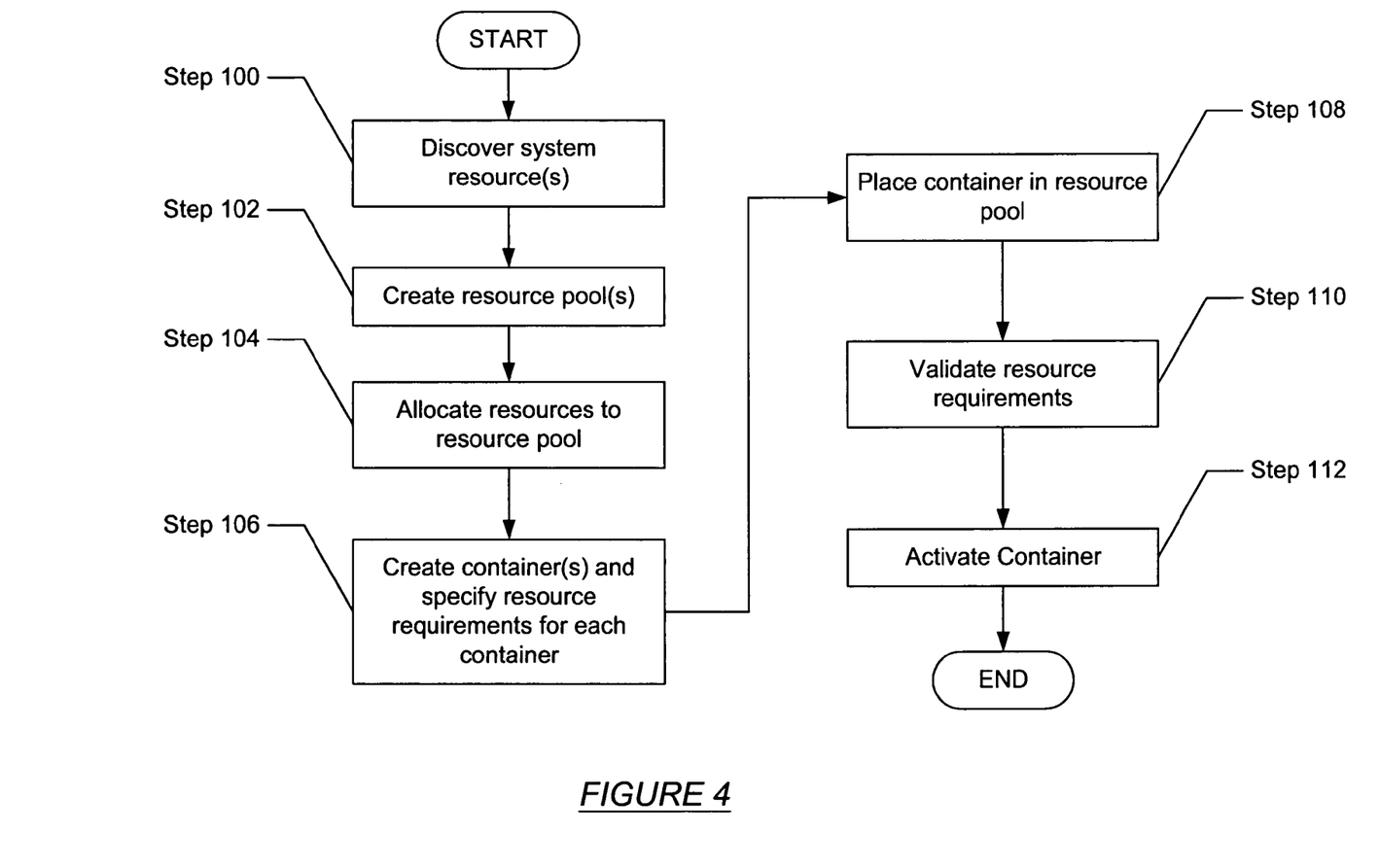
FIG. 4 shows a flow chart in accordance with one embodiment of the invention.

FIG. 4 shows a flow chart showing a method in accordance with one embodiment of the invention. Initially, system resources are discovered (Step 100). In one embodiment of the invention, the discovered system resources (including corresponding properties such as number, size, location, etc.) are stored in a database. One or more resource pools are subsequently created (Step 102). Creating the resource pool typically includes associating a processor set and, optionally, a scheduling class assignment with the resource pool. Once the resource pool has been created, system resources may also be allocated to the resource pool (e.g., CPUs, physical memory, bandwidth, etc.) (Step 104).

Once the resource pool has been created and system resources have been allocated to the resource pool, one or more containers may be created (Step 106). In one embodiment of the invention, creating the container includes generating a container definition in which individual system resource requirements are specified. In one embodiment of the invention, the container is created and resource requirements are specified using a container template.

Once the containers have been created and the resource requirements specified, the containers are placed within a resource pool (i.e., a container is deployed) (Step 108). Prior to activating the container in the resource pool, the resource requirements for the container are validated to determine whether the resource pool in which the container is deployed contains the necessary resources to support the container (Step 110). If the resource requirements for the container are valid, the container is activated in the resource pool (Step 112). Once a container has been activated, the system users (or groups) as defined by the ACL specified for the container may execute applications (or services) within the container.

Alternatively, the resource requirements are modified and the container is re-validated until the resource pool can support the container (not shown). The container may also be deployed in another resource pool that includes sufficient system resources. Those skilled in the art will appreciate that the aforementioned steps do not necessarily need to be performed in the order shown in FIG. 4.

In one embodiment of the invention, the system resources used by a container are not allowed to exceed the resource requirements specified in the container definition. Alternatively, if all the resources allocated to a particular resource pool in which the container is executing are not being used, then an application (or service) executing within the container may use additional resources not specified in the corresponding container definition up to the resources available in the corresponding resource pool. In one embodiment of the invention, a physical memory cap daemon is used to enforce physical memory usage of applications (or services) executing in a container.

Those skilled in the art will appreciate that while the containers have been described with respect to three resources (i.e., CPU, physical memory, and bandwidth), the invention may be applied to other system resources as well. Thus, the container definition for each container may specify more than the three aforementioned system resources.

Figure 5:
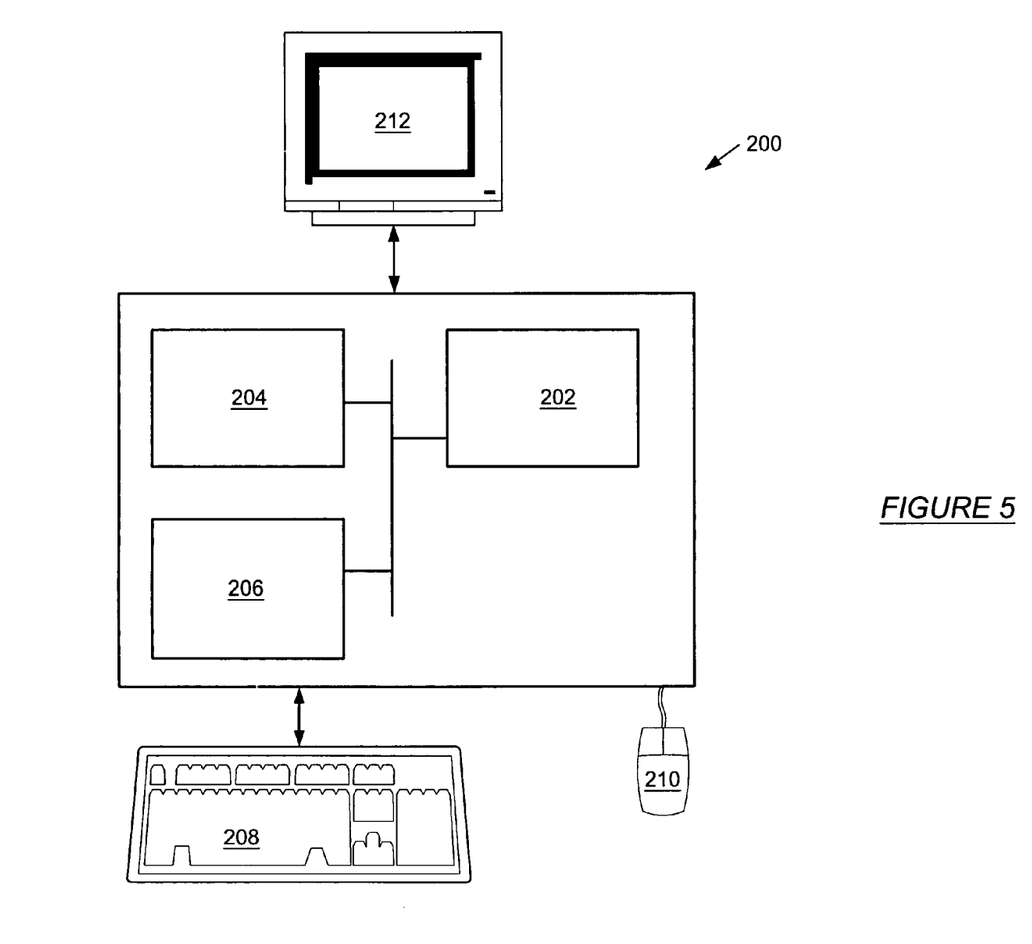
FIG. 5 shows a computer system in accordance with one embodiment of the invention.

The invention may be implemented on virtually any type of computer regardless of the platform being used. For example, as shown in FIG. 5, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (200) may be located at a remote location and connected to the other elements over a network. Further, the invention may be implemented on a distributed system having a plurality of nodes, where each portion of the invention (i.e., the helper action, the instrumented application, the tracing framework, etc.) may be located on a different node within the distributed system. In one embodiment of the invention, the node corresponds to a computer system. Alternatively, the node may correspond to a processor with associated physical memory.

By introducing a container model, only single type of resource management control mechanism (i.e., partitioning) is exposed to the system users. Thus, a single system may be partitioned into a single or multiple resource pools, and each resource pool may be further partitioned into a single or multiple containers. Internally, the management interface still uses the aforementioned resource management control mechanisms via the management utilities/APIs to achieve the optimal system resource management. Embodiments of the invention provide a method and apparatus to allow a system user to allocate system resources without requiring the system user to understand the individual management utilities/APIs.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing resources of a computer system, comprising:
    creating a first resource pool and a second resource pool within the computer system, wherein the computer system comprises a first resource and a second resource;
    allocating a first portion of the first resource to the first resource pool;
    allocating a second portion of the first resource to the second resource pool;
    allocating a first portion of the second resource to the first resource pool;
    allocating a second portion of the second resource to the second resource pool;
    creating a first container and a second container within the first resource pool;
    specifying resource requirements for the first container; wherein the resource requirements for the first container specify a first requirement for the first resource and a first requirement for the second resource;
    determining whether the resource requirements for the first container are valid, wherein the resource requirements for the first container are valid when the first requirement for the first resource does not exceed the first portion of the first resource and the first requirement for the second resource does not exceed the first portion of the second resource;
    activating the first container only if the resource requirements for the first container are valid, wherein activating the first container enables at least one system user to use the first container;
    upon receiving an indication of a requirement to deactivate the first container, deactivating the first container by releasing the first requirement of the first resource and the first requirement of the second resource from the first container;

transferring a project executing in the first container to a default container before the first container is deactivated; and executing the project in the default container.

2. The method of claim 1, further comprising:
executing a project within the first container while the first container is active.

3. The method of claim 2, further comprising:
collecting statistics corresponding to the executing of the project in the first container.

4. The method of claim 2, further comprising:
triggering an alert if the project executing within the first container attempts to use more than the first portion of the first resource.

5. The method of claim 2, wherein the project does not use more than the first portion of the first resource while executing in the first container.

6. The method of claim 2, wherein the project is placed in the first container by a user listed on an access control list associated with the first container.

7. The method of claim 1, further comprising:
specifying resource requirements for the second container; wherein the resource requirements for the second container specify a second requirement for the first resource and a second requirement for the second resource.

8. The method of claim 7, further comprising:
determining whether the resource requirements for the second container are valid, wherein the resource requirements for the second container are valid when the second requirement for the first resource does not exceed the first portion of the first resource and the second requirement for the second resource does not exceed the first portion of the second resource; and activating the second container only if the resource requirements for the second container are valid, wherein activating the second container enables the at least one system user to use the second container.

9. The method of claim 1, further comprising:
modifying the first portion of the first resource after the first container is activated.

10. The method of claim 9, wherein modifying the first portion of the first resource comprises modifying a container definition of the first container.

11. The method of claim 1, wherein creating the first container comprises:
defining a container name;
specifying a minimum CPU requirement for the container;
specifying a maximum physical memory limit; and
specifying a maximum outgoing network bandwidth.

12. The method of claim 11, wherein creating the first container further comprises:
specifying a project associated with the first container, wherein the project is one of a plurality of processes.

13. The method of claim 12, wherein each of the plurality of processes is identified by a common identifier.

14. The method of claim 1, wherein the first resource is at least one selected from a group consisting of a plurality of processors, physical memory and bandwidth.

15. A computer system, comprising:
a first resource and a second resource;
a plurality of resource pools, wherein a first resource pool of the plurality of resource pools is allocated a first portion of the first resource and a first portion of the second resource, and wherein a second resource pool of the plurality of resource pools is allocated a second portion of the first resource and a second portion of the second resource;

a plurality of containers residing in the first resource pool, wherein a first container of the plurality of containers comprises a requirements specification for the first resource for the first container and a requirements specification for the second resource for the first container; and a management interface configured to:
activate the first container only upon validating that the requirements specification for the first resource for the first container does not exceed the first portion of the first resource and that the requirements specification for the second resource for the first container does not exceed the first portion of the second resource, and upon receiving an indication of a requirement to deactivate the first container,
deactivate the first container by releasing the requirements specification for the first resource and the requirements specification for the second resource from the first container;
transfer a project executing in the first container to a default container before the first container is deactivated; and
execute the project in the default container.

16. The system of claim 15, further comprising:
a database configured to track:
the first portion of the first resource;
the first portion of the second resource;
the requirements specification of the first resource for the first container; and
the requirements specification of the second resource for the first container.

17. The system of claim 15, further comprising;
a second container of the plurality of containers, wherein the second container comprises a requirements specification the first resource for the second container and a requirements specification for the second resource for the second container.

18. The system of claim 17, wherein the usage of the first resource and the second resource by the first container and the second container is determined using fair share scheduling.

19. The system of claim 15, wherein the management interface is configured to modify the requirements specification for the first resource for the first container.

20. The system of claim 15, wherein the requirements specification for the first resource for the first container and the requirements specification of the second resource for the first container are included in a container definition of the first container.

21. The system claim 15, wherein the project corresponds to a network-wide administrative identifier used to identify related processes.

22. The system of claim 21, wherein the amount of the first resource used to execute the project in the first container does not exceed the first portion of the first resource allocated to the first container.

23. The system of claim 21, wherein the amount of the first resource used to execute the project in the first container does not exceed the requirements specification of the first resource for the first container.

24. The system of claim 21, wherein the management interface is configured to track usage of the first resource and the second resource by the project.

25. The system of claim 21, wherein the project is placed in the first container by a user listed on an access control list associated with the first container.

26. The system of claim 15, further comprising:
a first management utility configured to manage the first resource; and
a second management utility configured to manage the second resource,
wherein the management interface is further configured to interface with the first management utility and the second management utility to manage the portion of the first resource and the portion of the second resource allocated to the resource pool.

27. The system of claim 15, wherein the management interface is further configured to discover the first resource and the second resource.

28. The system of claim 15, wherein the first container comprises:
a container name;
a minimum CPU requirement for the container;
a maximum physical memory limit;
specifying a maximum outgoing network bandwidth.

29. The system of claim 15, wherein the first resource is at least one selected from a group consisting of a plurality of processors, physical memory and bandwidth.

30. A network system having a plurality of nodes, comprising:
a first resource and a second resource;
a plurality of resource pools, wherein a first resource pool of the plurality of resource pools is allocated a first portion of the first resource and a first portion of the second resource, and wherein a second resource pool of the plurality of resource pools is allocated a second portion of the first resource and a second portion of the second resource;
a plurality of containers residing in the resource pool, wherein a first container of the plurality of containers comprises a requirements specification for the first resource for the container and a requirements specification for the second resource for the container; and
a management interface configured to:
activate the first container only upon validating that the requirements specification for the first resource for the first container does not exceed the first portion of the first resource and that the requirements specification for the second resource for the first container does not exceed the first portion of the second resource, and
upon receiving an indication of a requirement to deactivate the first container,
deactivate the first container by releasing the requirements specification for the first resource and the requirements specification for the second resource from the first container;
transfer a project executing in the first container to a default container before the first container is deactivated; and
execute the project in the default container;
wherein the first resource is located on any one of the plurality of nodes,
wherein the second resource is located on any one of the plurality of nodes,
wherein the first resource pool is located on any one of the plurality of nodes,
wherein the first container is located on any one of the plurality of nodes,
wherein the management interface executes on any one of the plurality of nodes, and
wherein the first resource comprises a plurality of processors.

* * * * *